US006667871B2

(12) United States Patent
Berlovan et al.

(10) Patent No.: US 6,667,871 B2
(45) Date of Patent: Dec. 23, 2003

(54) ARRESTER HOUSING WITH WEAK SECTION

(75) Inventors: Viorel Berlovan, Medina, OH (US); Glen A. Weis, Wadsworth, OH (US)

(73) Assignee: Hubbell Incorporated, Orange, CT (US)

( * ) Notice: Subject to any disclaimer, the term of this patent is extended or adjusted under 35 U.S.C. 154(b) by 373 days.

(21) Appl. No.: 09/784,334

(22) Filed: Feb. 16, 2001

(65) Prior Publication Data

US 2002/0114119 A1 Aug. 22, 2002

(51) Int. Cl.[7] .................................................. H02H 9/00

(52) U.S. Cl. ........................... 361/118; 361/56; 361/58; 361/111

(58) Field of Search ................................. 361/111, 127, 361/117, 118, 119, 56, 58, 120

(56) References Cited

U.S. PATENT DOCUMENTS

| | | | | |
|---|---|---|---|---|
| 4,456,942 A | | 6/1984 | Bronikowski | 361/127 |
| 4,463,405 A | | 7/1984 | Koch et al. | 361/135 |
| 4,609,902 A | | 9/1986 | Lenk | 337/30 |
| 4,930,039 A | * | 5/1990 | Woodworth et al. | 361/127 |
| 5,043,838 A | | 8/1991 | Sakich | 361/117 |
| 5,088,001 A | | 2/1992 | Yaworski et al. | 361/127 |
| 5,128,824 A | | 7/1992 | Yaworski et al. | 361/127 |
| 5,309,313 A | | 5/1994 | Yaworski et al. | 361/127 |
| 5,633,620 A | | 5/1997 | Doerrwaechter | 338/21 |
| 6,008,975 A | | 12/1999 | Kester et al. | 361/117 |
| 6,014,306 A | | 1/2000 | Berlovan et al. | 361/127 |

* cited by examiner

*Primary Examiner*—Stephen W. Jackson
(74) *Attorney, Agent, or Firm*—Tara L. Hoffman; Mark S. Bicks; Alfred N. Goodman

(57) ABSTRACT

An electrical device includes a housing with first and second portions. Each of the first and second portions has a first insulative layer and a second conductive layer. The first and second layers define an inner cavity. The second portion has opposing first and second lateral sides with the first layer defining a first thickness at the first lateral side and a second thickness at the second lateral side. An electrically conductive member is received within the inner cavity in the first portion. At least one electrical component is received within the inner cavity at the second portion. A weak section is defined by the first thickness at the first lateral side being substantially less than the second thickness at the second lateral side diametrically opposite it at given points along a longitudinal axis of the second portion.

20 Claims, 2 Drawing Sheets

ARRESTER HOUSING WITH WEAK SECTION

BACKGROUND OF THE INVENTION

Conventional protective electrical devices, such as surge arresters, provide protection for equipment of power distribution systems during fault conditions caused by a system disturbance, such as a lighting strike. An overload of current resulting from a system disturbance can damage and/or destroy electrical equipment because the amount of current is much greater during the disturbance relative to during normal operating conditions.

Conventional surge arresters include an outer housing with two end terminals for connecting the arrester between a conductor device, such as a bushing insert, and ground. Held within the housing of a conventional arrester is a stack of arrester elements or metal oxide varistor (MOV) blocks. The MOV blocks allow the arrester to divert the overload current through the arrester to ground, thereby protecting the electrical equipment. In particular, as the voltage applied to the MOV blocks is increased, due to a system disturbance, the impedance of the MOV blocks decreases towards zero and the blocks become highly conductive thereby conducting the resulting current overload to ground.

Typically during fault conditions, conventional surge arresters rupture and separate from the bushing insert of the electrical equipment, to which it was connected. Arcing typically occurs within the arrester resulting in the generation of gas and heat as the internal arrester elements vaporize. During such a catastrophic failure, the arrester will rupture due to the generated gases that cannot be vented quickly enough from the arrester housing. Commonly, the housing ruptures in random areas, particularly near the connection of the bushing insert and the arrester, thereby forcing the arrester away from the bushing insert such that the arrester separates from the bushing insert. The conventional arresters fail to provide a mechanism for preventing separation of the arrester from the bushing insert during a fault event.

Examples of conventional arresters are disclosed in U.S. Pat. Nos. 6,014,306 to Berlovan et al.; 6,008,975 to Kester et al.; 5,633,620 to Doerrwaechter; 5,309,313 to Yaworski et al.; 5,088,001 to Yaworski et al.; 5,043,838 to Sakich; and 4,463,405 to Koch et al.

SUMMARY OF THE INVENTION

Accordingly, an object of the present invention is to provide an electrical device for a power distribution system and a method of making same that provides protection for the system equipment during a fault condition.

Another object of the present invention is to provide an electrical device for a power distribution system and a method of making same that provides a mechanism for limiting separation of the electrical device from an electrical connector of the system.

Yet another object of the present invention is to provide an electrical device for a power distribution system and a method of making same that provides a weak section in the housing of the device that allows controlled venting of internal gases upon rupture of the housing.

The foregoing objects are basically attained by an electrical device, comprising a housing including first and second portions with each of the first and second portions having a first insulative layer and a second conductive layer.

The first layer defines an inner cavity, and the second portion has opposing first and second lateral sides. The first layer defines a first thickness at the first lateral side and a second thickness at the second lateral side. An electrically conductive member is received within the inner cavity in the first portion. At least one electrical component is received within the inner cavity at the second portion. A weak section in the first lateral side of the second portion of the housing is defined by the first thickness at the first lateral side that is substantially less than the second thickness at the second lateral side diametrically opposite thereto at given points along a longitudinal axis of the second portion.

The foregoing objects are also basically attained by a method of making an electrical device, comprising the steps of forming an outer conductive layer, forming the inner cavity in first and second portions thereof and placing a mandrel in the inner cavity of the second portion of the conductive layer. The mandrel has a teardrop cross sectional shape. Molding an inner insulative layer by injecting a substantially resilient insulative material into the inner cavity at a second portion of the housing and around the mandrel, thereby forming an inner cavity in the insulative layer into teardrop cross-sectional shape that is substantially identical to the tear drop cross-sectional shape of the mandrel.

By fashioning the electrical device in this manner, a controlled venting of internal gases is provided through the weak section. Arranging the weak section rupture in a direction away from an electrical connector device to which the electrical device is connected to avoid disconnection.

Other objects, advantages and salient features of the invention will become apparent from the following detailed description, which, taken in conjunction with annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
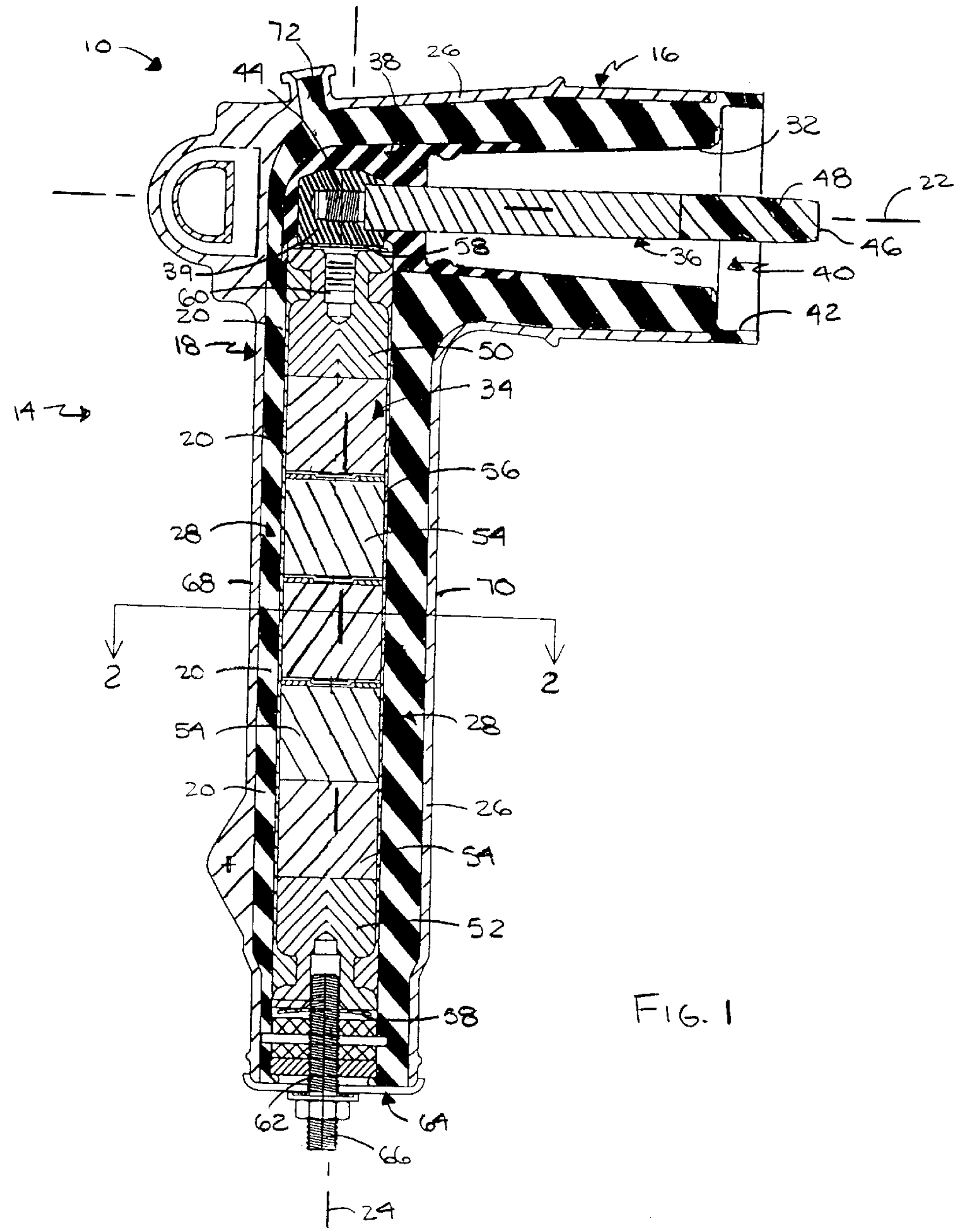
FIG. 1 is a side elevational view in section of a surge arrester in accordance with an embodiment of the present invention.

Referring to FIGS. 1–4, a surge arrester 10 in accordance with the present invention generally includes housing 14 having a bushing interface portion 16 for connection with an electrical connector, such as a bushing insert 12, and a shank portion 18 for connection to a ground. Bushing interface portion 16 and shank portion 18 form a substantially elbow shaped arrester, as is well known in the art. Shank portion 18 has a weak section 20 that provides a controlled rupture of the housing to vent or release internal gases that develop during a fault closure. The controlled rupture assists in preventing separation of arrester 10 and bushing insert 12.

Housing 14 has the general shape of an elbow with bushing interface or first portion 16 extending along a first central longitudinal axis 22 and shank or second portion 18 extending along a second central longitudinal axis 24, with the first axis being angularly disposed with respect to said second axis, preferably at generally ninety degrees. A conventional housing for a surge arrester is disclosed in U.S. Pat. No. 6,014,306 to Berlovan et al., the subject matter of which is hereby incorporated by reference.

A conductive jacket 26 forms the outer layer of housing 14 and an insulative layer 28 forms an inner lining, as is conventional in the art. The outer conductive jacket 26 is preferably made of conductive EPDM rubber, and the inner insulative layer 28 is preferably made of insulating EPDM rubber. Insulative layer 28 forms an inner cavity 30 at the shank portion 18 of housing 14 that receives an electrical component or module 34. At the bushing interface portion 16 of the housing 14, insulative layer 28 forms inner cavity 32 that includes a centrally disposed conductive member or probe 36 that mates with contacts of bushing insert 12.

With respect to bushing interface portion 16 of housing 14, a conductive insert 38, formed of conductive EPDM rubber, sits within inner cavity 32 and provides an electrical connection between conductive probe 36 and electrical module 34. A bushing port 40 for receiving the end of bushing insert 12 in a telescoping arrangement is defined between conductive insert 38 and an end opening 42 of inner cavity 32. Conductive insert 38 includes a copper portion 39 that accepts a threaded end 44 of conductive probe 36 with its opposing end 46 extending through end opening 42. An albative member 48 is included with opposing end 46 of probe 36, as is known in the art.

As to shank portion 18, electrical component 34 fits within inner cavity 30. Electrical component forms a module that particularly includes first and second end terminals 50 and 52 with conventional metal oxide varistor (MOV) blocks 54 stacked and axially aligned between first and second end terminals 50 and 52. Surrounding first and second end terminals 50 and 52 and MOV blocks 54 is a fiberglass weave casing 56 that tightly secures the blocks 54 and end terminals 50 and 52 together forming a generally tubular module having a right circular cylindrical shape. Springs 58 are applied on each of first and second end terminals 50 and 52, respectively, to further compress the elements of electrical component 34, thereby ensuring an electrical path through end terminals 50 and 52 and blocks 54.

Figure 4:
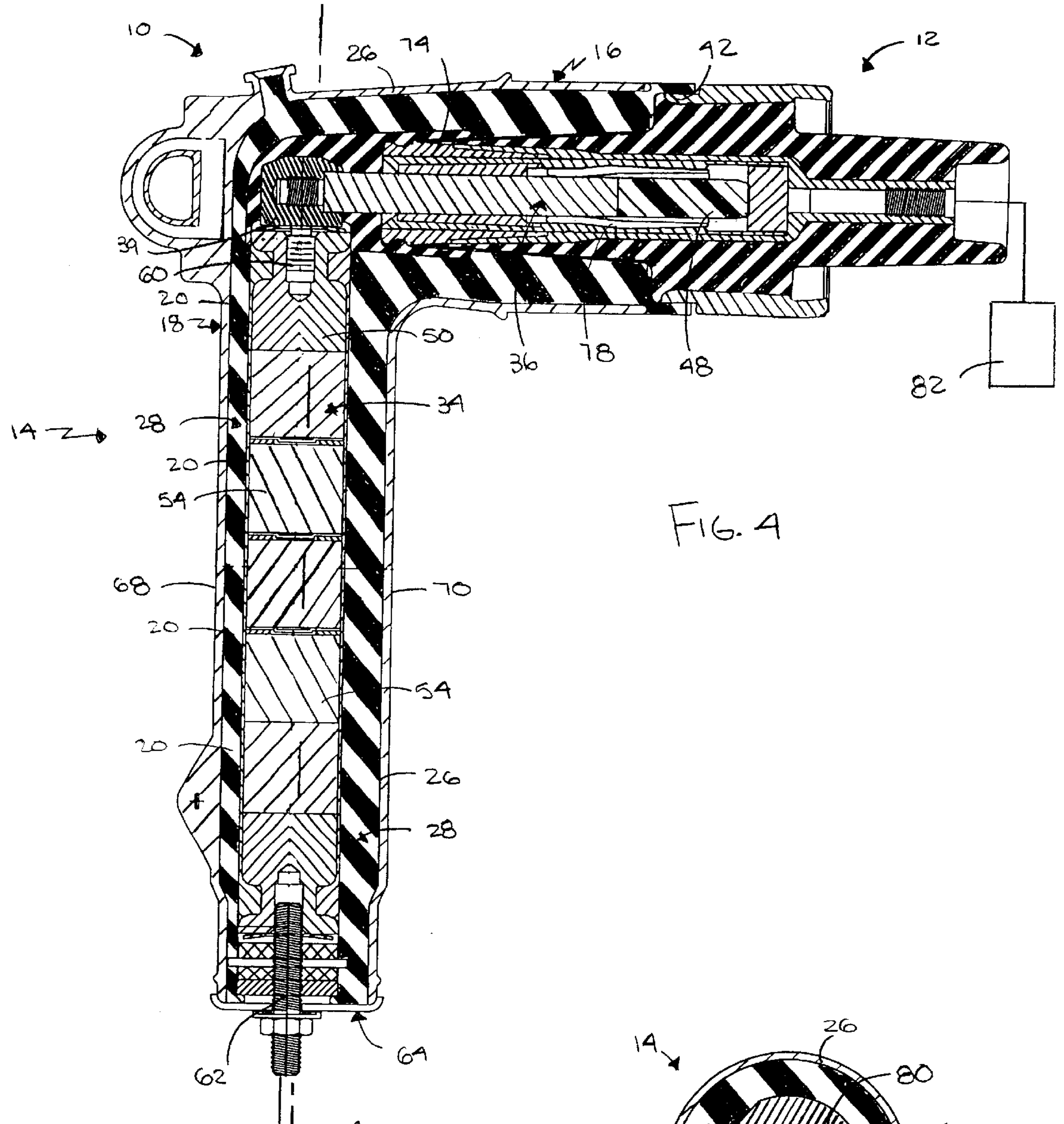
FIG. 4 is a side elevational view of the surge arrester illustrated in FIG. 1, showing the surge arrester mated with a bushing insert.

As with conductive probe 36, conductive insert 38 is also electrically connected at copper portion 39 to electrical component or module 34 by a threaded connection 60 through first end terminal 50. At the opposite or second end terminal 52, a threaded fastener 62 engages terminal 52 and secures an end cap 64 to the end of shank portion 18. As seen in FIG. 4, a grounding cable 63 can be connected to threaded fastener 62 at its bottom end 66 remote from terminal 52, thereby providing an electrical connection between electrical module 34 and ground 67.

Figure 2:
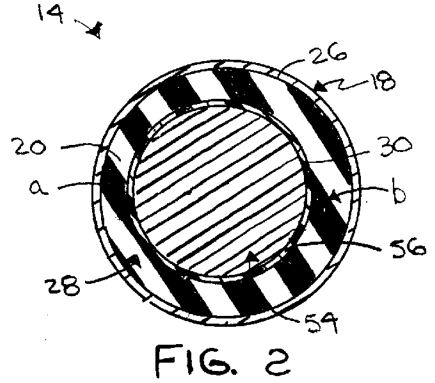
FIG. 2 is a top plan view in section of the surge arrester taken along line 2—2 of FIG. 1, showing a housing of the surge arrester with a weak section after insertion of a module of MOV blocks within the housing.

Weak section 20 is located in the side of shank portion 18 of housing 14, as best seen in FIGS. 1 and 2. Specifically, shank portion 18 has diametrically opposed first and second sides 68 and 70 laterally disposed from central longitudinal axis 24. Inner insulative layer 28 defines a first thickness a in section transverse to central axis 24 at first lateral side 68 and similarly a second thickness b at second lateral side 70 of shank portion 18 with first thickness a being substantially less than second thickness b. Making housing 14 weaker at first lateral side 68 of shank portion 18 than at second lateral side 70 defines weak section 20. Weak section 20 extends along and is substantially continuous along generally the entire length of shank portion 18, as seen in FIG. 1, the length being generally defined between end cap 64 and the interface portion 16 of housing 14. First thickness a being less than second thickness b laterally offsets electrical module 34 held in inner cavity 30 from central axis 24, so that electrical module 34 is closer to first lateral side 68 than second lateral side 70, and more of electrical module 34 is disposed on the side of central axis 24 that is near first lateral side 68.

Assembly

Forming surge arrester 10 is generally a three step molding process of first molding outer conductive jacket 26, then molding conductive insert 38, and finally molding inner insulative layer 28. Specifically, outer conductive jacket 26 is molded using a conventional mold including a solid generally L-shaped core mandrel. A conductive rubber is poured around the L-shaped core mandrel to form a one-piece unitary outer jacket 26 with a hollow interior. Jacket 26 can then be removed from the mold simply by removing it from the L-shaped core mandrel. Next, conductive insert 38 is separately formed in a conventional manner.

Figure 5:
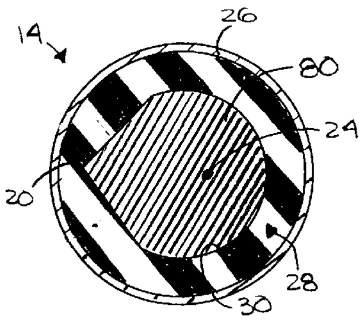
FIG. 5 is a top plan view in section of the surge arrester similar to FIG. 3, showing the housing of the surge arrester with a teardrop mandrel inserted within the housing.

Once outer conductive jacket 26 and conductive insert 38 are each molded, both are placed in another mold for forming inner insulative layer 28, with conductive insert 38 being placed within the hollow interior of jacket 26 at the junction point of the L-shaped jacket. First and second mandrels are then placed within the hollow interior of jacket 26 with conductive insert 38 being located between the mandrels. The first mandrel is placed in the interior at the part that will be the interface portion 16 of housing 14. The second mandrel 80 is placed in the interior of the part that will be the shank portion of housing 14 as seen in FIG. 5. Inner layer 28 is formed by injecting insulative material into jacket 26 and around the first and second mandrels, and conductive insert 38, forming a one-piece unitary layer.

Figure 3:
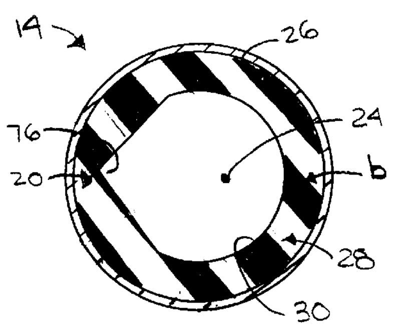
FIG. 3 is a top plan view in section of the surge arrester similar to FIG. 2, showing the housing of the surge arrester with the weak section, before insertion of the module of MOV blocks within the housing.

The first mandrel has a similar shape to the end portion 74 of bushing insert 12, to thereby form bushing port 40 of housing 14, which receives bushing insert 14, as is known in the art. As seen in FIG. 5, the second mandrel 80 has a particular shape of a substantially teardrop cross-sectional shape to form weak section 20 in inner layer 28 of housing 14. The material of inner layer 28 is injected through a funnel 72 formed in outer jacket 26, into its interior, and around the first and second mandrels, thereby forming inner cavities 30 and 32 at shank portion 16 and interface portion 18, respectively. The first and second mandrels can then be removed such that interface portion 16 of housing 14 is formed with inner layer 28 now defining inner bushing port 40, and shank portion 18 of housing 14 is formed with inner layer 28 now defining inner cavity 30. As seen in FIG. 3, inner cavity 30 has a substantially teardrop shape in section traverse to central axis 24 of shank portion 18 with the point 76 of the teardrop cross-section shape extending towards first lateral side 68 to create weak section 20.

Finally, electrical module 34 is placed within inner cavity 30. Upon insertion of module 34, inner layer 28 at inner cavity 30 conforms to the shape of module 34 forming a friction or interference fit between module 34 and inner layer 28, as best seen in FIG. 2. Specifically, the cylindrical shape of module 34 forces the flexible and resilient material of inner layer 28 to conform to its shape, so that inner cavity 30 has a substantially right circular cylindrical shape defined by inner layer 28. Since the point 76 is directed towards first lateral side 68, in transforming from a substantially teardrop cross-sectional shape to a right circular cylindrical shape, first thickness a of inner layer 28 at first lateral side 68 is formed so that it is less than second thickness b at second lateral side 70, thereby defining weak section 20 at first lateral side 68.

The remaining assembly is conventional and therefore will not be described in detail. In general, module 34 and probe 36 are connected to conductive insert 38 by threaded connection 60 and threaded end 44, respectively, so that an electrical path is created through probe 36, insert 38, and module 34. End cap 64 is secured to the end of shank portion 18 by threaded fastener 62 which is connected to end terminal 52 of module 34, and provides a ground connection.

Operation

Referring to FIGS. 1 and 4, surge arrester 10 connects to a bushing insert 12 of the electrical equipment for use with electrical equipment 82 of a power distribution system. During a fault event, weak section 20 of arrester 10 will provide a controlled venting of internal gases. The controlled venting will be directed away from bushing insert 12 and bushing interface portion 16 of arrester 10, rather than in random directions or in a direction toward bushing insert 12, thereby generally preventing separation of the arrester from the end portion 74 of bushing insert 12.

In particular, as is known in the art, upon connection of arrester 10 and bushing 12, end portion 74 of bushing insert 12 is received within bushing port 40 of arrester 10 in a telescoping manner. Probe 36 engages a female contact assembly 78 of bushing insert 12, thereby forming an electrical connection between arrester 10 and bushing 12.

During fault conditions, the overload of current results in the generation of gas and heat as the internal MOV blocks 54 of module 34 vaporize. This pressurized gas fills the inner cavities of arrester 10 until rupture occurs. The weak section 20 of shank portion 18 provides a controlled vent or rupture of the gases since the weak section will rupture first, thereby substantially preventing random ruptures in the arrester 10. By disposing weak section 20 at first lateral side 68 of shank portion 18 opposite and remote from interface portion 16 and bushing insert 12, arrester 10 is generally prevented from separating from bushing insert 12 because the force of the internal gases through weak section 20 tends to push arrester 10 toward bushing insert 12, and the occurrence of ruptures near or towards bushing insert 10 are substantially eliminated since weak section 20 will always rupture first.

While a particular embodiment has been chosen to illustrate the invention, it will be understood by those skilled in the art that various changes and modifications can be made therein without departing from the scope of the invention as defined in the appended claims.

What is claimed is:

1. An electrical device, comprising:

a housing including first and second portions, each of said first and second portions having a first insulative layer and a second conductive layer, said first and second layers defining an inner cavity, and said second portion having opposing first and second lateral sides with said first layer defining a first thickness at said first lateral side and a second thickness at said second lateral side;

an electrically conductive member received within said inner cavity in said first portion;

at least one electrical component received within said inner cavity at said second portion; and a weak section in said first lateral side of said second portion of said housing defined by said first thickness at said first lateral side being substantially less than said second thickness at said second lateral side diametrically opposite thereto so that a central axis of said electrical component is laterally offset from a central longitudinal axis of said second portion.

2. An electrical device according to claim 1, wherein said weak section is disposed remotely from said first portion of said housing.

3. An electrical device according to claim 2, wherein said weak section extends substantially continuously along an entire length of said second portion.

4. An electrical device according to claim 1, wherein a casing encloses said electrical component.

5. An electrical device according to claim 4, wherein said electrical component comprises a plurality of axially aligned metal oxide varister blocks.

6. An electrical device according to claim 1, wherein said first layer is an inner layer; and said second layer is an outer layer.

7. An electrical device according to claim 1, wherein said first portion extends along a longitudinal axis substantially perpendicular to said central longitudinal axis of said second portion.

8. An electrical device according to claim 1, wherein said electrically conductive member is an electrically conductive probe electrically connectable to an electrical connector.

9. An electrical device according to claim 8, wherein said first portion of said housing includes an end opening for receiving said electrical connector in said inner cavity.

10. An electrical device according to claim 1, wherein said first layer is a unitary, one-piece member; and said second layer is a unitary, one-piece member.

11. An electrical device, comprising:

a housing including a first portion extending along a first axis, and a second portion extending along a second axis oriented at an angle to said first axis, said second axis being a central longitudinal axis, each of said first and second portions having an inner insulative layer and an outer conductive layer, said inner layer defining an inner cavity, said second portion having opposing first and second lateral sides with said first lateral side being remote from said first portion of said housing so that said outer conductive layer at said first lateral side faces in a direction substantially opposite said first portion;

an electrically conductive member received within said inner cavity at said first portion;

an electrical component received within said inner cavity in said second portion; and a weak section of said inner insulative layer at said first lateral side of said second portion, said weak section being defined by a first thickness of said inner insulative layer in section substantially transverse to said second axis at said first lateral side, said first thickness being less than a second thickness formed by said inner insulative layer in section substantially transverse to said second central axis at said second lateral side of said second portions, so that a central axis of said electrical component is laterally offset from said second axis of said second portion.

12. An electrical device according to claim 11, wherein said first thickness is substantially continuous along an entire length of said second portion.

13. An electrical device according to claim 11, wherein a casing encloses said electrical component.

14. An electrical device according to claim 13, wherein said electrical component comprises a plurality of axially aligned electrical elements.

15. An electrical device according to claim 14, wherein said electrical elements are metal oxide varistor blocks.

16. An electrical device according to claim 11, wherein said inner insulative layer is a unitary, one-piece member; and said outer conductive layer is a unitary, one-piece member.

17. An electrical device according to claim 11, wherein said first portion of said first electrical device includes an end opening; and an electrical connector is received in said end opening and said inner cavity electrically connecting said electrical device and said electrical connector, whereby said weak section controls venting of gas from said inner cavity of said first portion at said second portion of said electrical device upon rupture thereof during an overload of current through said electrical connector and said electrical conductive member and said electrical component of said electrical device.

18. An electrical device according to claim 17, wherein said first axis is substantially perpendicular to said second axis.

19. A method of making an electrical device, comprising the steps of:

forming an outer conductive layer, including forming the inner cavity in first and second portions thereof;

placing a mandrel in the inner cavity of the second portion of the conductive layer, the mandrel having a teardrop cross sectional shape; and molding an inner insulative layer by injecting a substantially resilient insulative material into the inner cavity at a second portion of the housing and around the mandrel, thereby forming an inner cavity in the insulative layer with a tear drop cross sectional shape that is substantially identical to the teardrop cross-sectional shape of the mandrel.

20. The method of making an electrical device according to claim 19, further comprising the steps of removing the mandrel from the inner cavity of the housing; and inserting a right circular cylindrical electrical component into the inner cavity in the second portion of the housing, the electrical component having a transverse dimension, such that upon insertion into the inner cavity, the inner insulative layer conforms to the electrical component and the inner cavity has a substantially right circular cylindrical shape.

* * * * *